No. 697,269. Patented Apr. 8, 1902.
D. NADEL.
EMBROIDERING MACHINE.
(Application filed Dec. 30, 1898.)
(No Model.) 2 Sheets—Sheet 1.
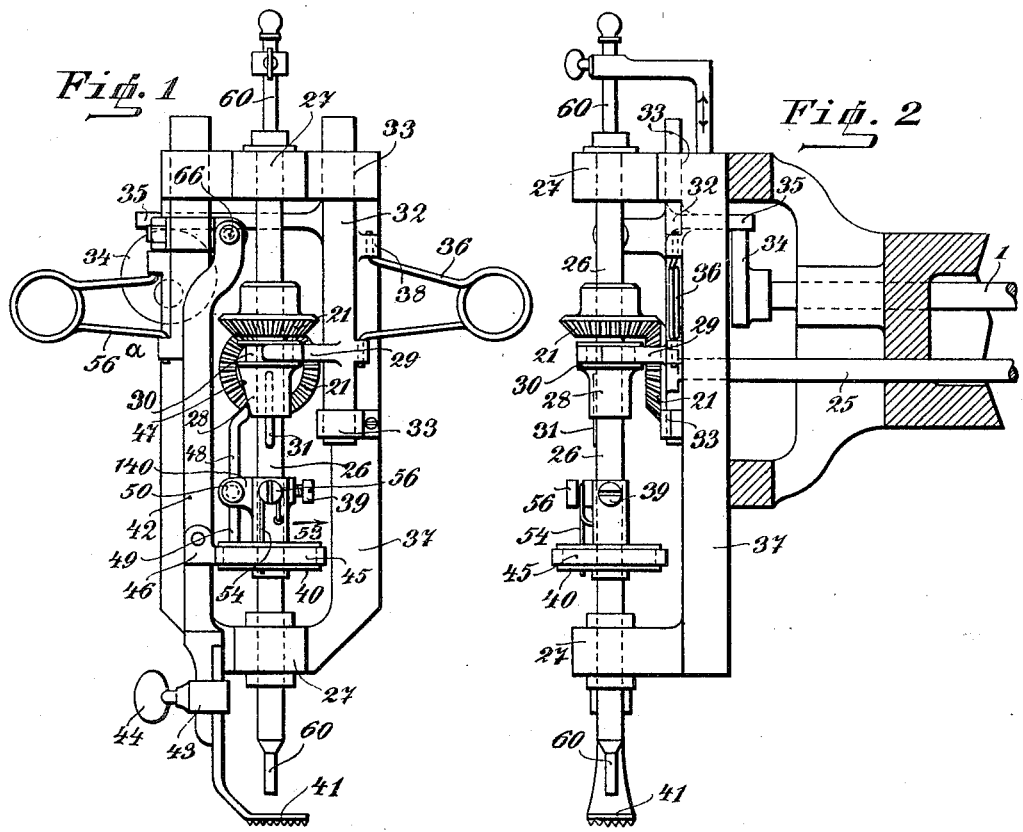
Witnesses
P. F. Lomek
N. P. Hammond
Inventor
David Nadel
By Knight Bros
Attys.

No. 697,269. Patented Apr. 8, 1902.
D. NADEL.
EMBROIDERING MACHINE.
(Application filed Dec. 30, 1898.)

(No Model.) 2 Sheets—Sheet 2.

Witnesses
P. F. Somek.
W. P. Hammond.

Inventor:
David Nadel
by Knight Bros
Attys

UNITED STATES PATENT OFFICE.

DAVID NADEL, OF BERLIN, GERMANY.

EMBROIDERING-MACHINE.

SPECIFICATION forming part of Letters Patent No. 697,269, dated April 8, 1902.

Application filed December 30, 1898. Serial No. 700,748. (No model.)

*To all whom it may concern:*

Be it known that I, DAVID NADEL, a subject of the Emperor of Germany, residing at Spindlershof 4, Seidelstrasse, Berlin, in the Kingdom of Prussia and Empire of Germany, have invented certain new and useful Improvements in Crank-Machines for Guiding Fabric when being Embroidered, Stitched, or Similarly Treated, of which the following is a full, clear, and exact description.

The present invention relates to improvements in embroidering-machines; and the object of it is to secure the side movement of the feed presser-foot in any desired direction, as well as to permit at any time the alteration of the direction of the feed movement, both these movements without the fear of being disturbed by stagnations of the driving mechanism.

Reference is to be had to the accompanying drawings, in which—

Figure 5:
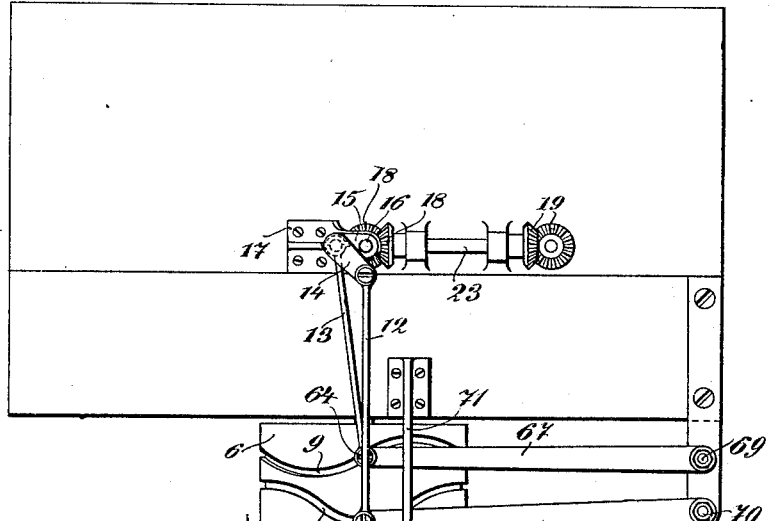
Figure 3:
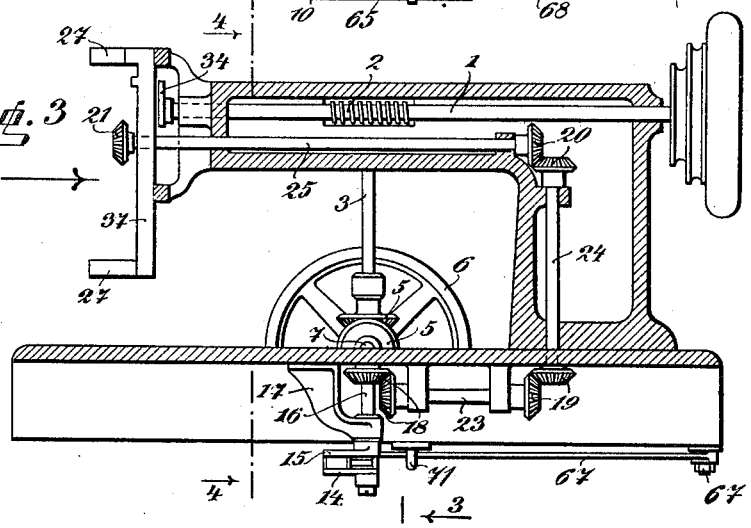
Figure 4:
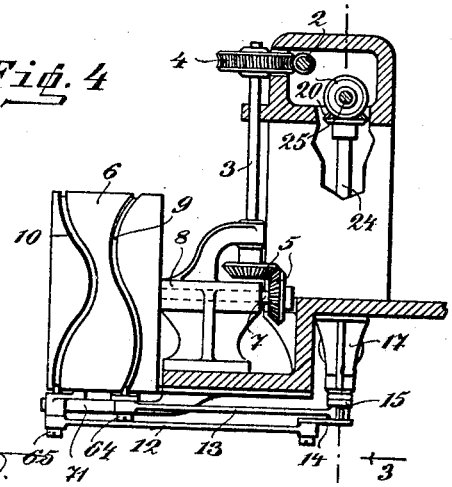

Figure 1 is a front view of that part of the embroidering-machine containing the needle-bar and the feed device with its presser-foot. Fig. 2 is a side view of the same, partly in section. Fig. 3 is a longitudinal section through the machine on the line 3 3, Fig. 4, showing the gear for moving the presser-foot, other parts of the mechanism being omitted. Fig. 4 is a cross-section on the line 4 4, Fig. 3. Fig. 5 is a bottom view of the machine. Figs. 6, 7, and 8 are detail views of parts of the feed mechanism hereinafter described.

1 is the main shaft, driven continuously by the usual strap or cord. A worm 2, rigidly fixed on the main shaft 1, rotates a vertical shaft 3 by means of a worm-wheel 4. Bevel-wheels 5 serve to transmit the slow rotation of the shaft 3 to a drum 6, rigidly secured on a shaft 7, mounted in a bearing 8. In the circumference of the drum 6 are cut cam grooves or paths 9 and 10, which by means of the connecting-rods 12 13 transmit movement to a crank having arms 14 15, one of which is rigidly secured on a shaft 16, Fig. 3, which is mounted in a bracket 17. By bevel-wheels 18, 19, 20, and 21 the rotation of the shaft 16 will be transmitted to shafts 23 24 25 and finally to a vertical hollow shaft 26, Figs. 1 and 2. The hollow shaft 26 is mounted in the bearings 27 and carries a socket 28, which by means of a vertically-movable fork 29 and a circular notch or gland 30 may be moved up and down, but is compelled to rotate with the hollow shaft 26 by the spline 31. The fork 29 is rigidly mounted on a bar 32, sliding in eyes 33 and moved upward by an eccentric 34, Figs. 1 and 2, which is rigidly secured on the main shaft 1. In order to transmit the upward movement from the eccentric 34 to the fork-bar 32, the latter is provided with a rigid arm 35. The downward movement of the fork-bar 32 is obtained by the spring 36, the lower end of which rests on a projection on the fork-bar 32, while its upper end bears upward against a projection 38 on the immovable front frame 37 of the machine. By a set-screw 39 a fork 140, Figs. 1, 6, and 8, is rigidly secured on the hollow shaft 26, the lower part of which is rectangular in cross-section and supplies a horizontal guide for a disk 40, serving to give the presser-foot 41 the horizontal movement necessary to enable the machine to embroider designs which consist of uniformly-repeated regular or irregular lines of straight or curved shape.

The presser-foot 41 is secured on a bar 42, by means of a socket 43 and a set-screw 44 on the bar 42, and receives a swinging movement by the disk 40, which is embraced by a ring 45, the fork 46 secured to the bar 42. A swivel-joint 66 serves as a suspension-point for the bar 42. The socket 28 is provided with an inclined surface 47, which is continually in contact with the upper arm of a lever 48 49, pivotally attached to the fork 46 by means of a pin 50. The lower arm 49 of this lever engages in a hole 51 of the disk 40. As the main shaft 1 rotates the socket 28 is also moved up and down, thereby by its inclined surface 47 causing the lever 48 49 to move the disk 40 in the direction of the arrow 53. During the upward movement of the socket 28 the disk 40 is pushed backward against the direction of the arrow 53 by a wire spring 54, catching in a hole 55 of the disk 40, and being rigidly secured on the main part of the fork 46 by a screw 56. The disk 40 embraces the rectangular part 155 of the fork 46, the hole 52 of the disk 40 being sufficiently lengthened to permit the horizontal movement of the latter, 40, already described.

A spring 56ª presses the presser-foot downward upon the material to be embroidered. As the slight up-and-down movement of the presser-foot and the purpose of it, as well as the means by which this movement will be obtained, are well known, these means are not further described. These particular movements and the means to secure them also form no part of the present invention. The same is the case with the parts shown in Figs. 1, 2, and 6 to 8; but as the present invention will not be understood without referring to those parts of the machine these latter are fully described. The needle (not shown in the drawings) is secured on the lower end of the rod 60, sliding with high speed lengthwise and up and down in the hollow shaft 26. The mechanism which imparts this movement to the rod 60 is well known, and therefore it also forms no part of the present invention.

It will be seen from the foregoing that as the sleeve 28 by the shaft 1, the eccentric 34, and the slide-bar 32 is moved with the same high speed as the needle-rod 60, the lever 48 continuously oscillates on its pin 50, thereby by means of the disk 40 the strap 45, and the rod 42 imparting a reciprocating fore-and-back motion to the presser-foot 41. The hollow shaft 26 is continuously turned with low speed, thereby taking with it the sleeve 28 and the disk 40, and the direction of the reciprocating movement of the presser-foot is continually altered, so that a curved seam will be obtained. To continually and correspondingly repeat this curved seam in such a manner that each time the end point of one curve forms the beginning of the following one, the drum 6 is provided and each whole revolution corresponds to every such curved seam, as during the time necessary for the drum to turn once around the hollow shaft, together with the sleeve 28 and the disk 40, will complete a revolution.

It will be clearly seen that the shape of the curved seam depends upon the manner in which the shaft 26 is turned, as well as upon the measure of horizontal movement or push of the presser-foot. If the hollow shaft 26 is turning perfectly uniform and the fabric is pushed slowly by the presser-foot, the curve will have another shape than if the shaft turns irregularly and the foot 41 pushes the fabric with greater speed.

Whether the hollow shaft is turned regularly or irregularly depends only upon the shape of the cam-paths 9 and 10, governing the turning movement of the crank-arms 14 and 15. These crank-arms are theoretically arranged in an angle of ninety degrees with respect to another; but as the lower arm 14 is rigidly secured on the crank-pin of the upper 15 this arm 14 is actually directed in an angle of forty-five degrees with respect to the arm of the upper crank 15, as clearly shown in Fig. 5. The disposition of the two cam-paths 9 and 10 of the drum 6, together with the crank-arms 14 and 15, arranged at an angle to each other, forms the substantial object of the present invention.

The crank-arms are, as described, arranged at an angle to each other, and each of the connecting-rods 12 and 13 is attached to the outer end of the corresponding arm or attached so that the effective working angle is ninety degrees. The cam-paths are complementary—that is to say, they are so arranged that each path will operate the crank and shaft to control the feed mechanism; but one crank-arm will be at its maximum leverage while the other is at its minimum, so that no dead-centers can occur, and the work is carried on continuously.

To prevent the pins 64 65 from coming out of gear with the cam-paths 9 and 10, the rods 67 68 may be provided and pivotally attached at 69 70. A guide-bar 71 serves for supporting their ends, thereby keeping the pins in contact with the notches.

I claim—

1. An embroidering-machine comprising in combination stitch-forming mechanism, feeding mechanism and controlling mechanism therefor comprising a crank and means for operating the crank comprising a pattern-drum having complementary cam-paths, and independent elements operatively connecting said cam-paths and crank.

2. An embroidering-machine comprising in combination stitch-forming mechanism, feeding mechanism, and means for controlling the feeding mechanism comprising a crank, a pattern-drum having complementary cam-paths, elements connecting the crank and the cam-paths and so disposed that the leverage of one is at its maximum while the other is at its minimum.

3. An embroidering-machine comprising in combination stitch-forming mechanism, feeding mechanism and means for controlling the feeding mechanism including a shaft, a crank having arms arranged at an angle to each other and carried by the shaft, a pattern-drum having complementary cam-paths, and means connecting the cam-paths and crank-arms respectively for the purpose described.

4. An embroidering-machine comprising in combination stitch-forming mechanism, feeding mechanism, and means for controlling the feeding mechanism comprising a shaft, a crank having two arms arranged at an angle to each other and secured to the shaft, a pattern-drum having two complementary cam-paths, and a pair of rods, each connecting a cam-path with the corresponding arm of the crank, the connections being so disposed that the effective working angle is greater than the actual angle of the arms.

5. An embroidering-machine comprising in combination stitch-forming mechanism, feeding mechanism, and means for controlling the feeding mechanism, comprising a shaft, a crank having arms arranged at an angle to each other and carried by the shaft, a pattern-drum having complementary cam-paths, connecting-rods, each attached to an arm of the crank and operated by the cam-paths, and means for holding the rods in position in the cam-paths, substantially as described.

In witness whereof I subscribe my signature in presence of two witnesses.

DAVID NADEL.

Witnesses:
ERWIN L. GOLDSCHMIDT,
WOLDEMAR HAUPT.